US009973590B2

(12) United States Patent
Wu

(10) Patent No.: US 9,973,590 B2
(45) Date of Patent: May 15, 2018

(54) USER IDENTITY DIFFERENTIATED DNS RESOLUTION

(71) Applicant: Bing Wu, Plano, TX (US)

(72) Inventor: Bing Wu, Plano, TX (US)

( * ) Notice: Subject to any disclaimer, the term of this patent is extended or adjusted under 35 U.S.C. 154(b) by 214 days.

(21) Appl. No.: 14/953,022

(22) Filed: Nov. 27, 2015

(65) Prior Publication Data

US 2017/0155645 A1  Jun. 1, 2017

Related U.S. Application Data

(60) Provisional application No. 62/081,616, filed on Nov. 26, 2011.

(51) Int. Cl.
| | |
|---|---|
| *G06F 15/16* | (2006.01) |
| *H04L 29/08* | (2006.01) |
| *H04L 29/12* | (2006.01) |
| *H04L 29/06* | (2006.01) |

(52) U.S. Cl.
CPC ...... *H04L 67/2842* (2013.01); *H04L 61/1511* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 2003/0163722 A1* | 8/2003 | Anderson, IV | ... H04L 29/12216 | 726/3 |
| 2003/0172183 A1* | 9/2003 | Anderson, IV | ... H04L 29/12216 | 709/245 |
| 2010/0023611 A1* | 1/2010 | Yang | ................. H04L 29/12066 | 709/223 |
| 2010/0274970 A1* | 10/2010 | Treuhaft | ........... H04L 29/12066 | 711/118 |
| 2012/0023153 A1* | 1/2012 | Karasaridis | ......... H04L 61/1511 | 709/203 |
| 2012/0158969 A1* | 6/2012 | Dempsky | ............ H04L 61/6013 | 709/226 |
| 2013/0268649 A1* | 10/2013 | Kinra | ................. G06F 17/30864 | 709/224 |
| 2015/0019708 A1* | 1/2015 | Denis | ....................... H04L 43/04 | 709/224 |
| 2015/0215388 A1* | 7/2015 | Kontothanassis | ... H04L 67/1002 | 709/226 |
| 2015/0256508 A1* | 9/2015 | Townsend | ............... H04L 61/20 | 709/245 |

(Continued)

*Primary Examiner* — Kenny S Lin

(57) ABSTRACT

Systems and methods for DNS resolution based on user identities are provided herein. In the DNS name resolution process, a DNS resolver can construct and send DNS queries to different DNS name servers depending on the identities of the users requesting the name resolution. One embodiment may be a DNS forwarder configured in a home router, where DNS requests from a certain user group (e.g., kids) may be forwarded to OpenDNS Family Shield, while DNS requests from another user group (e.g., parents) may be forwarded to the ISP's default DNS servers or Google Public DNS. In another embodiment, the DNS resolver may be integrated within an authenticating proxy server, wherein the DNS resolver may use different DNS name servers to perform DNS name resolution for different users authenticated by the proxy server.

20 Claims, 10 Drawing Sheets

(56) References Cited

U.S. PATENT DOCUMENTS

| | | | |
|---|---|---|---|
| 2015/0312331 A1* | 10/2015 | Crocker | H04L 63/061 709/205 |
| 2016/0036857 A1* | 2/2016 | Foxhoven | H04L 63/20 726/1 |
| 2016/0094557 A1* | 3/2016 | Kadur | H04L 63/083 726/3 |
| 2016/0142375 A1* | 5/2016 | Tubi | H04L 63/0281 726/1 |
| 2016/0205106 A1* | 7/2016 | Yacoub | H04L 61/1511 726/28 |
| 2016/0323409 A1* | 11/2016 | Kolhi | H04L 61/1511 |

* cited by examiner

USER IDENTITY DIFFERENTIATED DNS RESOLUTION

BACKGROUND OF THE INVENTION

Embodiments of the present invention relate to Internet Protocol (IP) network communications, more specifically, to techniques for domain name system (DNS) resolution.

On an Internet Protocol (IP) network, each participating device is identified by an Internet Protocol address (IP address). For Internet Protocol Version 4 (IPv4), the IP address is a 32-bit number. For Internet Protocol Version 6, (IPv6), the IP address is a 128-bit number. Additionally, computers or devices connected to the Internet or a private IP network can be assigned human-friendly hostnames. The Domain Name System (DNS) is a distributed naming system for computers, devices or other resources connected to the Internet or a private IP network. The Domain Name System (DNS) translates, among other things, hostnames into corresponding IP addresses via a process called DNS resolution. When a user accesses contents on a host, for example, by entering a URL (uniform resource locator) into the address bar of a web browser, the user's computer or device first resolves the IP address(es) of the destination host by looking up a DNS name server, then start the communication with the received IP address(es).

With the proliferation of the World Wide Web, various malicious or otherwise undesirable material come into existence, such as malware, fraud, information theft, identity theft, pornography, hate messages, etc. To mitigate the danger of exposing to such material, some DNS services block access to the material by redirecting the user to an alternate IP address where a warning message may be posted, instead of sending the user to the true IP address, where malicious content might be hosted. Some examples of such services are OpenDNS and Norton ConnectSafe.

In some situations, it is necessary to provide protective services such as those provided by OpenDNS and Notron ConnectSafe to one group of users, while at the same time allow access to the original content for another user group. For example, in a home network, kids may be blocked from adult themed contents but adults may be allowed. In a company network, normal users may be blocked from malware, phishing sites and scam sites, while security researchers may be allowed so that they can analyze the material and conduct risk assessment.

SUMMARY OF THE INVENTION

In various embodiments, a domain name system (DNS) resolution process may send domain name system (DNS) resolution requests to different domain name system (DNS) name servers, depending on the identities of the users requesting DNS name resolution.

One embodiment may be a DNS forwarder configured in a home router, where DNS requests from one user group (e.g., kids) may be forwarded to a DNS service that provides content filtering, for example, OpenDNS Family Shield; while DNS requests from another user group (e.g., parents) may be forwarded to a DNS service that does not perform such filtering, for example, the ISP's default DNS server or Google Public DNS. Thus users belonging to the first group are protected from seeing material inappropriate for them, while at the same time users belonging to the second group are not inhibited.

Another embodiment may be a DNS resolver integrated within an authenticating proxy server, which may send DNS queries to different DNS name servers, depending on the user identity provided by the authentication module in the proxy server.

In some embodiments, user identities may be determined through an authentication system, such as the authentication system of an operating system (OS), an embedded authentication module, a standalone authentication program, or a centralized directory service such as LDAP or Microsoft Active Directory.

In other embodiments, the identity of the user may be derived from (or equated to) a device identifier, such as the IP (Internet Protocol) address or the MAC (Media Access Control) address of the device, or the IMEI or MEID of a mobile device, from where the DNS name resolution request is originated. Some examples of such devices are: personal computers, cell phones, tablet computers, electronic book readers, MP3 players, PDAs, etc.

In further embodiments, a system for user identity differentiated domain name resolution may include a data store that maps user identities to specific DNS name servers among a plurality of DNS name servers made available to a DNS resolution process. The data store may be used by the DNS resolution process to determine the appropriate DNS name server to use for the identified user. Additionally, a user interface may be used to configure and manage the aforementioned data store.

In still further embodiments, the DNS response information received from the upstream DNS name servers may be stored in a local cache, on a per DNS name server basis or per user basis. A system for user identity differentiated domain name resolution may send a response directly to the client without consulting an upstream name server, if the requested information is available in the local cache, or when configuration rules indicate that a response should be or can be constructed without forwarding the request to an upstream name server. Configuration rules may also dictate that the DNS request be altered in certain ways based on the user identity associated with the request, before sending the request to an upstream name server. For example, an alternate name may be requested from an upstream name server instead of the one in the original request.

A further understanding of the advantages and improvements offered by the present invention may be realized by reference to the details presented below, with reference to accompanying drawings.

DETAILED DESCRIPTION

In an Internet Protocol (IP) communications network, users, in general, do not communicate directly with a DNS name server. When a user application, such as a web browser or an email client, requires a domain name resolution, i.e., needs to get the IP address(es) of a host name (domain name), it sends a DNS resolution request to the DNS Resolver. The DNS Resolver receives DNS name resolution requests from a client, creates DNS queries for the DNS name resolution requests, and handles the communications with a DNS name server.

The DNS Resolver presented herein may be a software library, a software component or module, firmware in an embedded system, or a hardware module designed for such purposes.

In general, two DNS name server IP addresses are provided for a Domain Name System (DNS) resolution service by a service provider, one of these is referred to as the "primary", the other "secondary". For example, the IP addresses for Google Public DNS are: 8.8.8.8 and 8.8.4.4. Both primary and secondary servers serve exactly the same data to clients, therefore, for purposes of the illustrations presented herein they are considered one, and will be referred to herein as one server.

Figure 1:
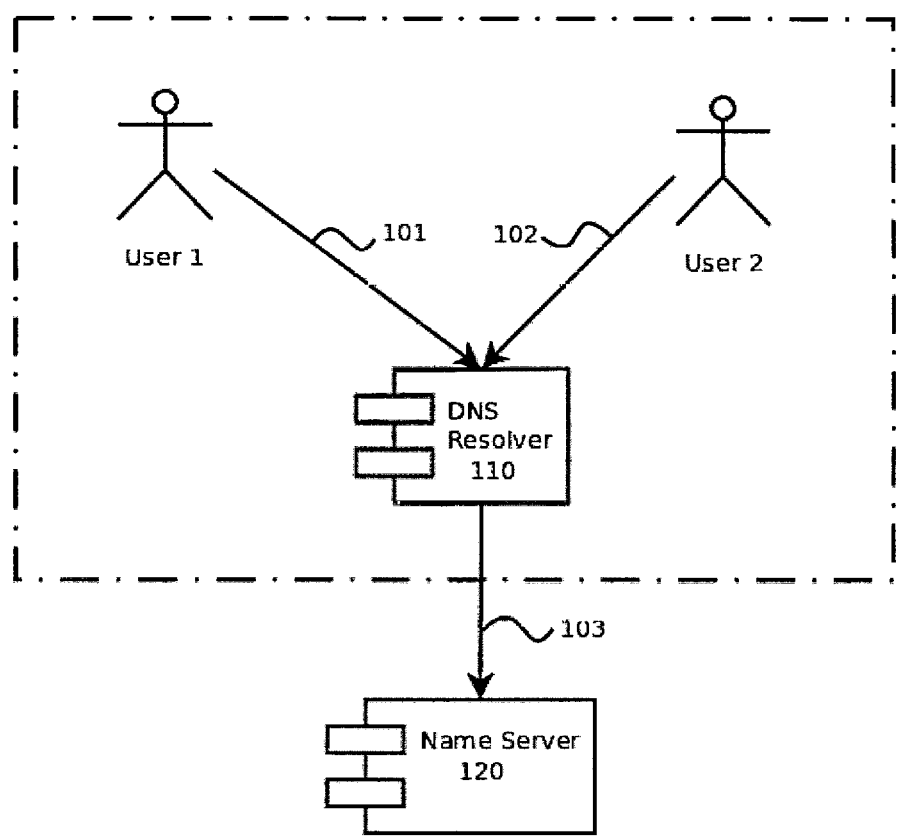
FIG. 1 is a diagram illustrating a prior art DNS resolution process.

FIG. 1 is a simplified diagram of a conventional DNS resolution process. In a conventional DNS resolution process, the domain name server is a system-wide configuration. As illustrated in FIG. 1, the DNS resolution processes are exactly the same for users user 1 and user 2, who are logged on to the same system.

Figure 2:
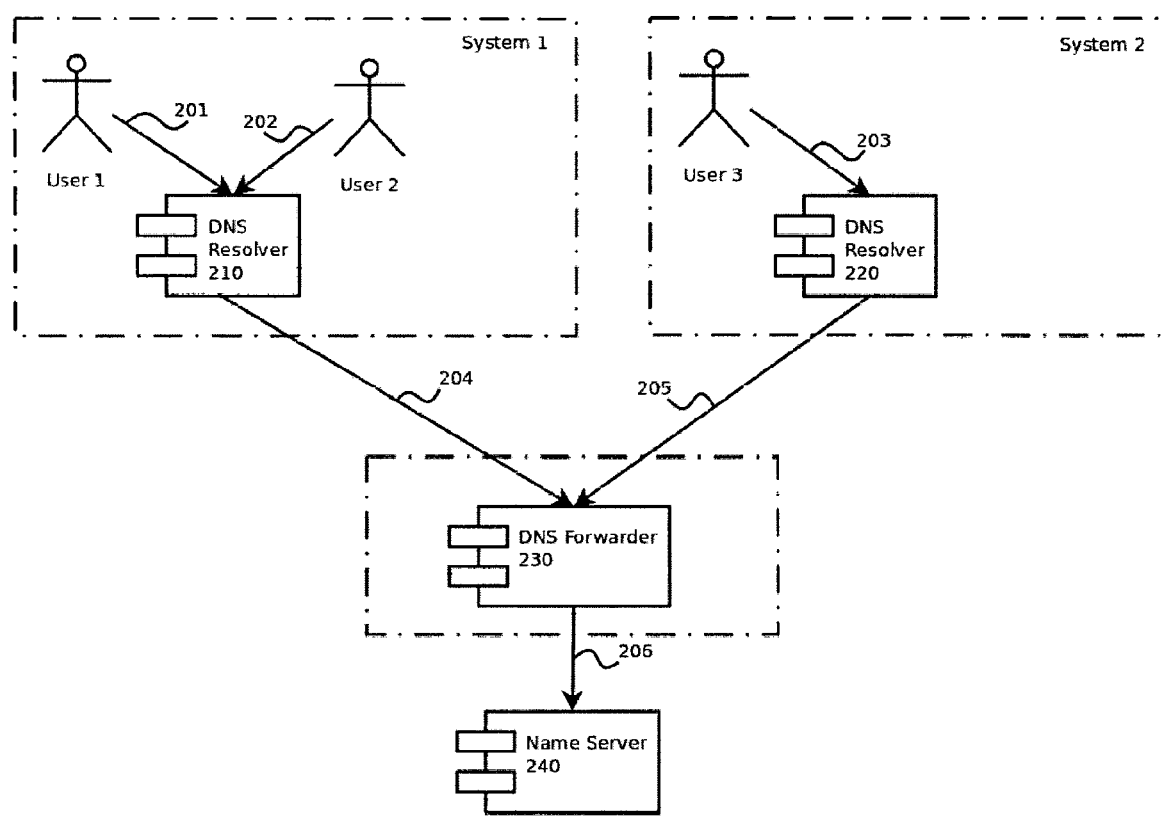
FIG. 2 is a diagram illustrating a variation of prior art DNS resolution process.

FIG. 2 is a diagram of a conventional DNS resolution process where a DNS forwarder is used. The DNS forwarder may be running in the user system or, as shown in the diagram, in a separate system, for example, a router, and shared by multiple user systems. Here, the DNS forwarder forwards DNS name resolution requests to the same DNS name server, irrespective of the identities of clients requesting the name resolution. Thus, as shown in FIG. 2, DNS name resolution requests initiated by user 1, user 2, on system 1 and DNS name resolution requests initiated by user 3 on system 2 are forwarded to the same DNS name server 240.

Figure 3:
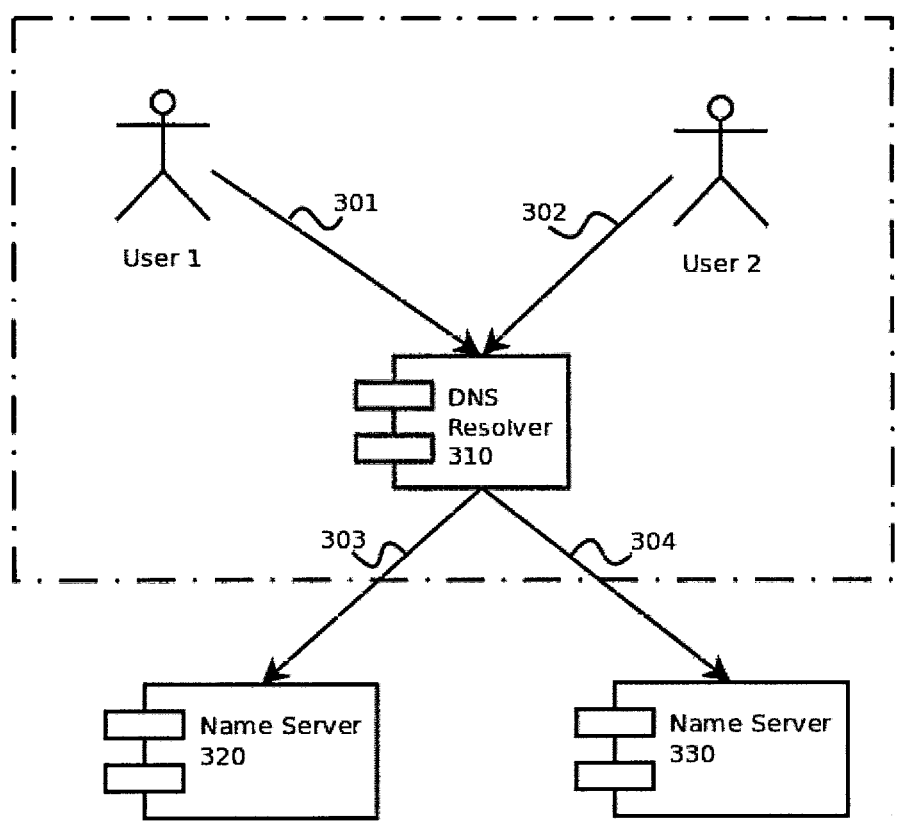
FIG. 3 illustrates an embodiment of the present invention for user identity differentiated DNS resolution.

FIG. 3 shows an exemplary system for user identity differentiated DNS resolution, according to an embodiment. FIG. 3 shows user 1 requesting a DNS name resolution, for example, by entering a URL into a web browser or starting communication with another system or systems through other means. The DNS name resolution request may contain one domain name or multiple domain names. The DNS name resolution request 301 is sent to the DNS Resolver 310. The DNS Resolver 310, by examining the incoming request, determines that the request was initiated by user 1, and by looking up user identity to Name Server mappings stored in a data store or configuration files, determines that the DNS resolution request should be handled by Name Server 320, and subsequently creates a DNS query 303 and sends it to Name Server 320. The Name Server 320 returns the IP address(es) of the requested domain(s) in a DNS response, and sends it to the DNS Resolver 310. The DNS Resolver 310 parses the DNS response and returns the IP address(es) of the requested domain(s) to user 1.

Similarly, a DNS name resolution request 302 initiated by user 2, also sent to DNS Resolver 310, may be routed to Name Server 330 (as depicted by line 304), depending on the user identity to Name Server mappings stored in the system.

User identities may be provided by the Operating System (OS), an application (such as an authenticating proxy server), a centralized authentication service (such as LDAP or Microsoft Active Directory), or any other means through which users may be authenticated.

Here, the user identity to Name Server mappings control which DNS name server should be used to satisfy DNS name resolution requests initiated by which user. It may be stored in a single or a set of configuration files, a database, or any other form of storage, and may be internal or external to the DNS Resolver 310. An exemplary mappings configuration is shown in the table below.

TABLE 1

| User | Primary DNS Server | Secondary DNS Server |
|---|---|---|
| user 1 | 208.67.222.222 | 208.67.220.220 |
| user 2 | 8.8.8.8 | 8.8.4.4 |

Figure 4:
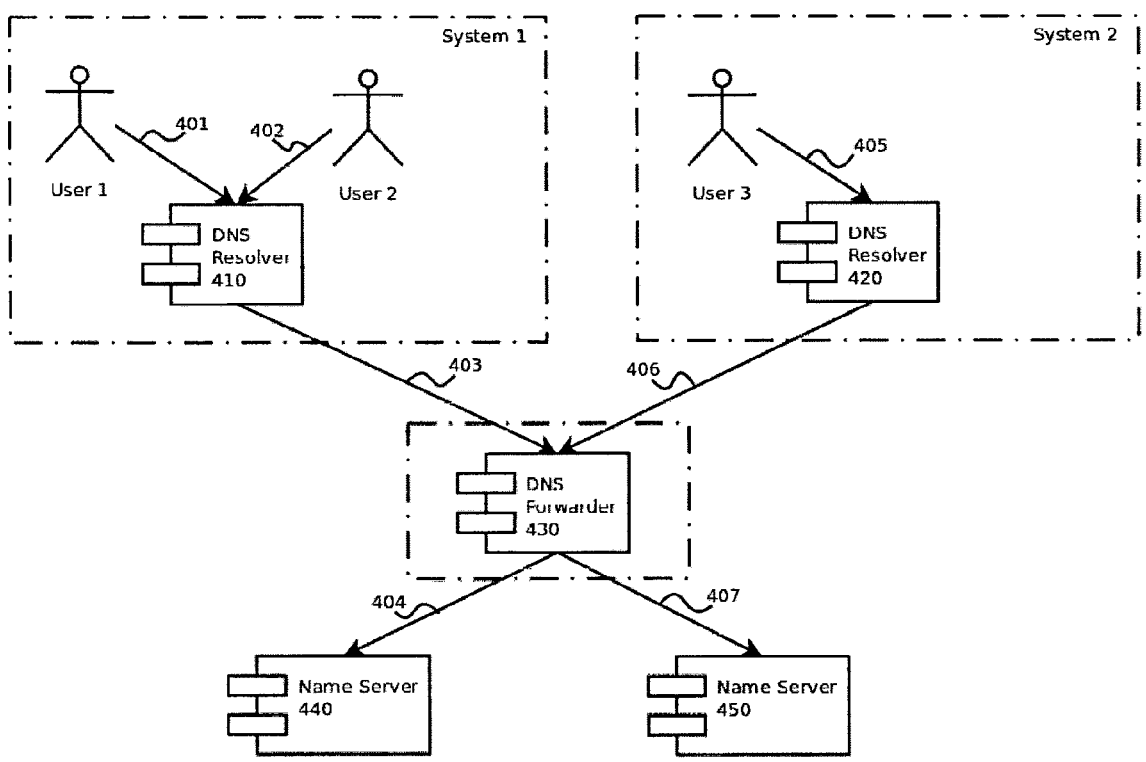
FIG. 4 illustrates an alternative embodiment of the present invention for user identity differentiated DNS resolution.

In another embodiment, the DNS Resolver may send DNS queries to a DNS Forwarder, instead of communicating directly with DNS name servers, as depicted in FIG. 4. The scenario may be a network of multiple computers or computing devices connected to the outside world via one or more common gateways, such as a company's corporate network, or a home network connected to the Internet via a wireless router, a DSL or cable modem, or other means made available by an Internet Service Provider (ISP).

As shown in FIG. 4, user 1 requests a DNS name resolution 401, which is sent to DNS Resolver 410. The DNS Resolver 410 creates a DNS query 403, and sends it to the DNS Forwarder 430. Upon receiving the DNS query, the DNS Forwarder 430 determines the user identity by examining the incoming request, and by looking up the user identity to Name Server mappings stored in the system, determines that the DNS name resolution request should be fulfilled by Name Server 440. It then forwards the DNS query 404 to the Name Server 440. The Name Server 440 returns the IP address(es) of the requested domain(s) in a DNS response, and sends it back to the DNS Forwarder 430. The DNS Forwarder 430 then forwards the DNS response back to the DNS Resolver 410. The DNS Resolver 410 parses the DNS response and returns the IP address(es) of the requested domain(s) to user 1.

Alternatively, the user identity to DNS Name Server mappings may be looked up by the DNS Resolver 410, and the selected DNS Name Server address may be sent along with the DNS query 403 to the DNS Forwarder 430.

Similarly, DNS resolution requests originated from user 2, on system 1 or user 3 on system 2 might end up being sent to Name Server 450, depending on user identity to Name Server mappings stored in the system. Here, the user identity to DNS Name Server mappings control which DNS name server should be used to satisfy DNS name resolution requests initiated by which user, and the storage may be internal to the DNS Resolver(s) (410, 420) or the DNS Forwarder 430, or external to the DNS Resolver(s) and the DNS Forwarder.

In some embodiments, the DNS Forwarder 430 can derive the identity of the user from the IP (Internet Protocol) address or the MAC (Media Access Control) address of the device where the DNS name resolution request comes from, for example, when the client device is a cell phone or MP3 player, or when the administrative policy equates each device to a unique user.

Figure 5:
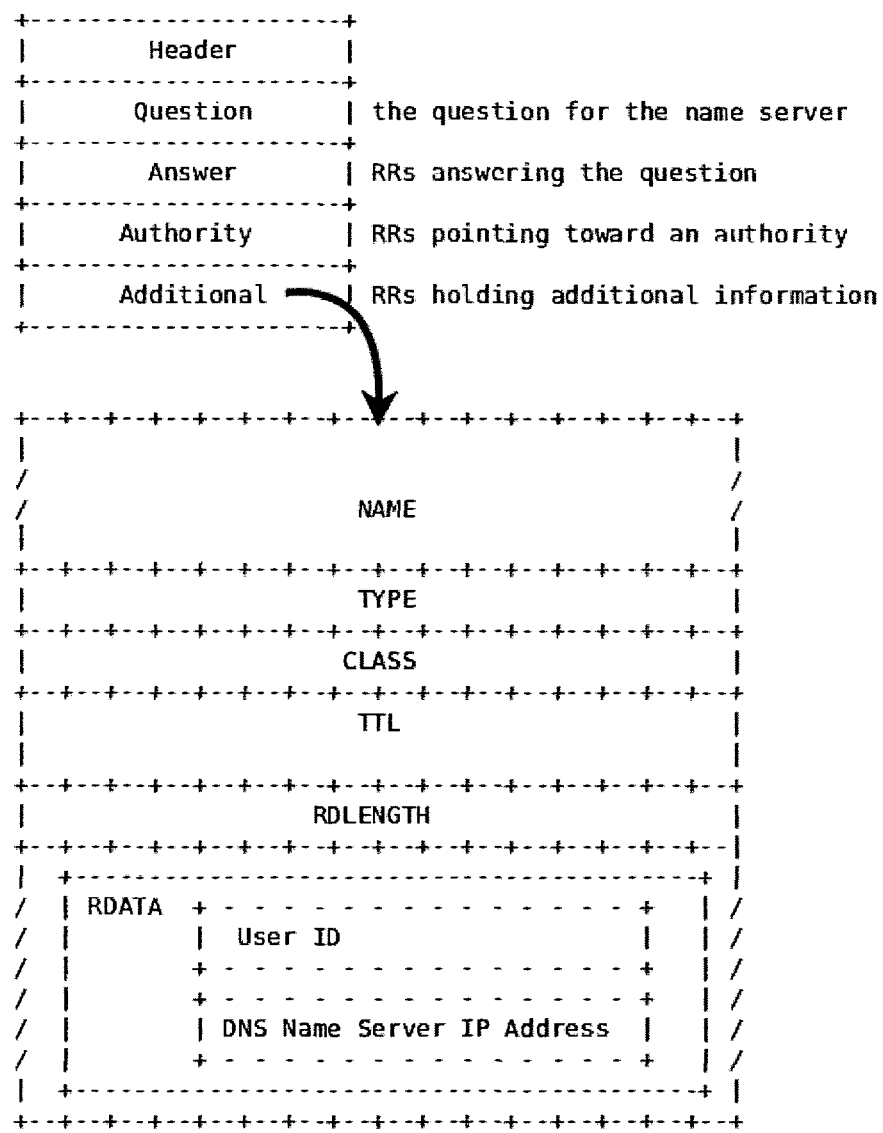
FIG. 5 is an exemplary structure of a DNS request message that may be used in a system for user identity differentiated DNS resolution.

In other embodiments, the DNS Resolver (410, 420) sends the user identity or, if the DNS Resolver selected a DNS name server to fulfill the DNS name resolution request, the selected DNS name server IP address in an Additional RR record in the DNS query data structure to the DNS Forwarder 430. An example of which is shown in FIG. 5. The user identity or DNS name server IP address may be sent in plain text, or encrypted, or signed, or signed and encrypted, or sent with another piece of information to ensure integrity and authenticity of the message.

Figure 6:
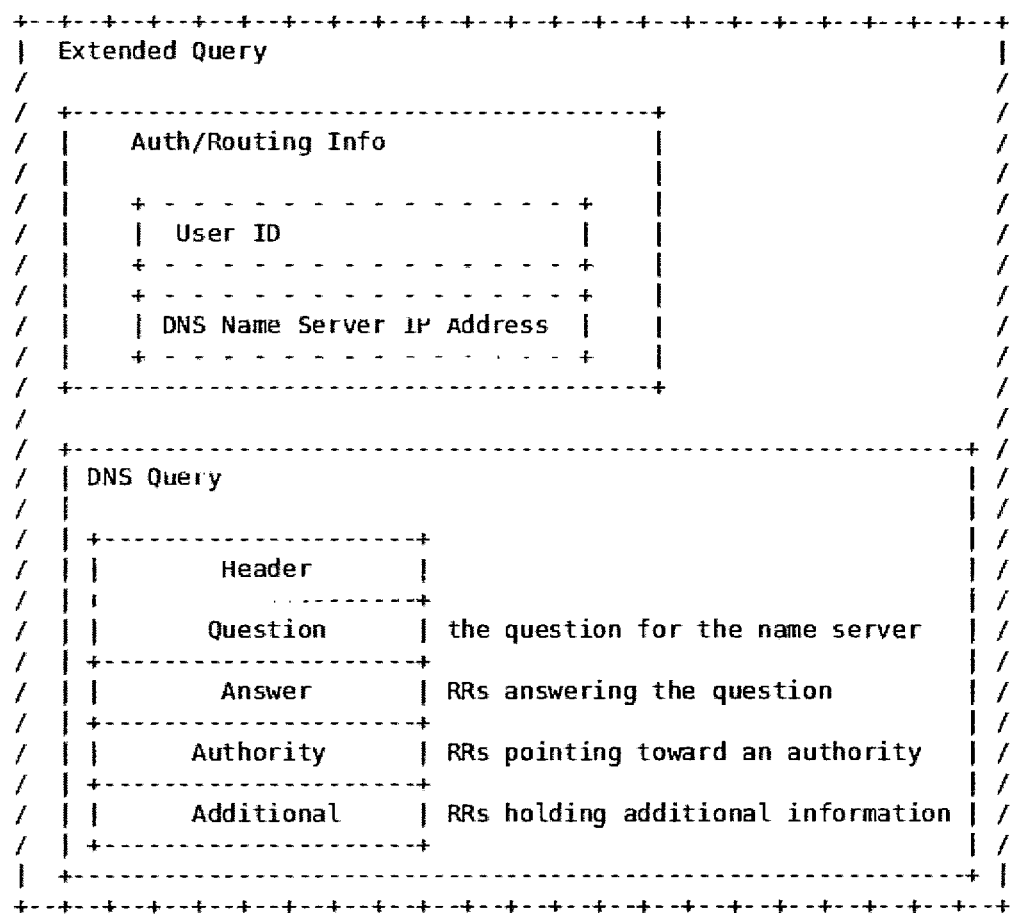
FIG. 6 is an alternative exemplary structure of a DNS request message that may be used in a system for user identity differentiated DNS resolution.

In still other embodiments, the DNS Resolver (410, 420) sends the user identity or, if the DNS Resolver selected a DNS name server to fulfill the DNS name resolution request, the selected DNS name server IP address alongside the DNS query to the DNS Forwarder 430, as illustrated in FIG. 6. The user identity or DNS name server IP address may be sent in plain text, or encrypted, or signed, or signed and encrypted, or sent with another piece of information to ensure integrity and authenticity of the message.

In both scenarios, depicted in FIG. 5 and FIG. 6, the DNS forwarder will need to be extended such that it understands the extra security information embedded in the DNS request record.

Figure 7:
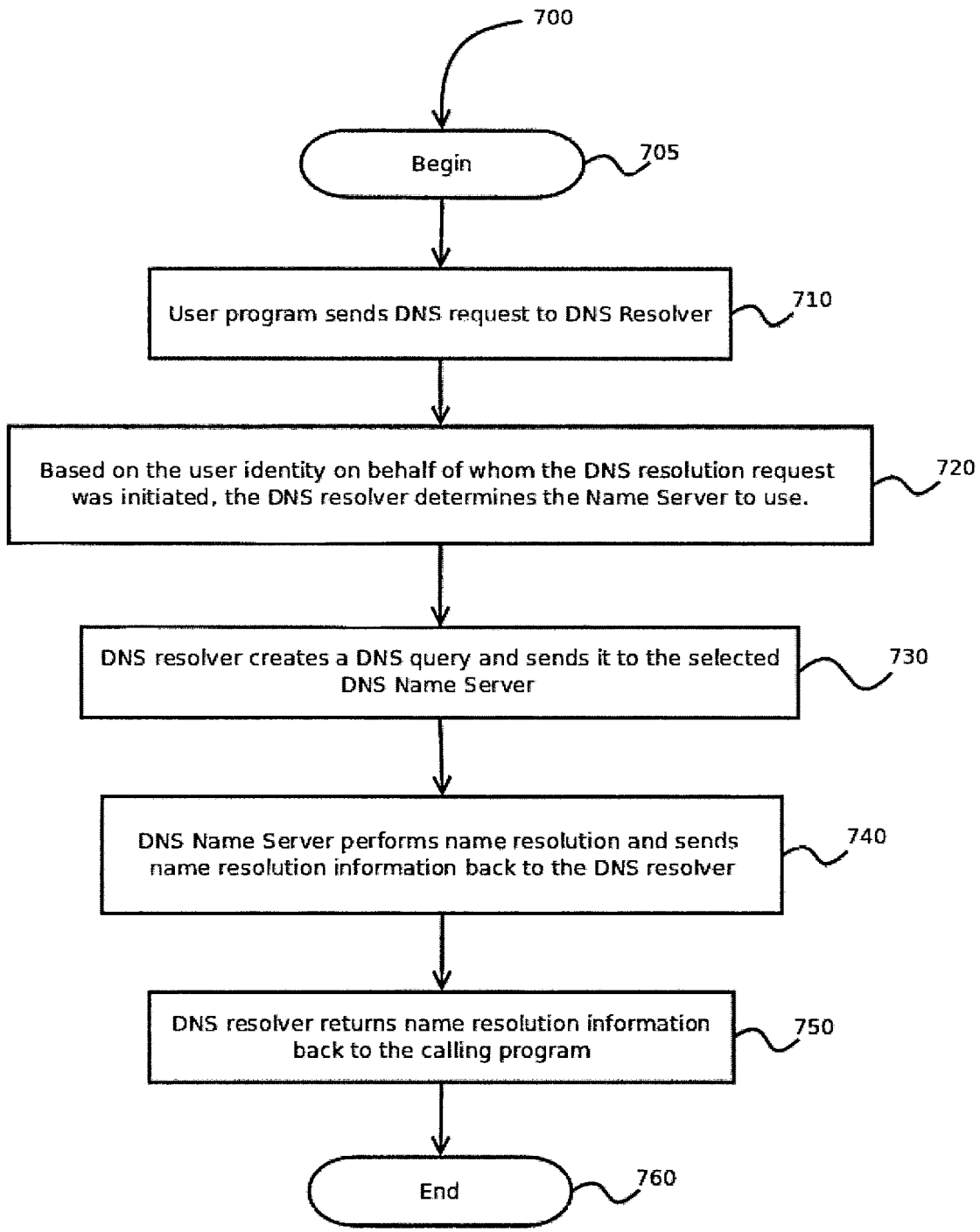
FIG. 7 is a flowchart illustrating a method of user identity differentiated DNS resolution, according to an embodiment shown in FIG. 3.

FIG. 7 is a flowchart of method 700 for providing user identity differentiated DNS name resolution, according to an embodiment of the present invention. The DNS name resolution process begins in step 705.

In step 710, the DNS Resolver receives a request for IP address(es) for one or more domain names. The DNS name resolution request may be created when the user tries to communicate with another system. For example, when the user enters a URL into a web browser, the browser may request the IP address of the domain name associated with the URL.

In step 720, the DNS Resolver finds the identity of the user on behalf of whom the request was sent, and determines the IP address of the Name Server to be used to fulfill the DNS name resolution request.

The DNS Resolver creates a DNS query and sends it to the selected DNS Name Server in step 730.

In step 740, the DNS Name Server resolves the domain name(s) requested by the DNS name resolution request and sends the DNS name resolution response back to the DNS Resolver.

In step 750, the DNS Resolver returns the IP address(es), among other things, of the requested domain name(s) to the program that initiated the DNS name resolution request. The processing ends in step 760.

Figure 8:
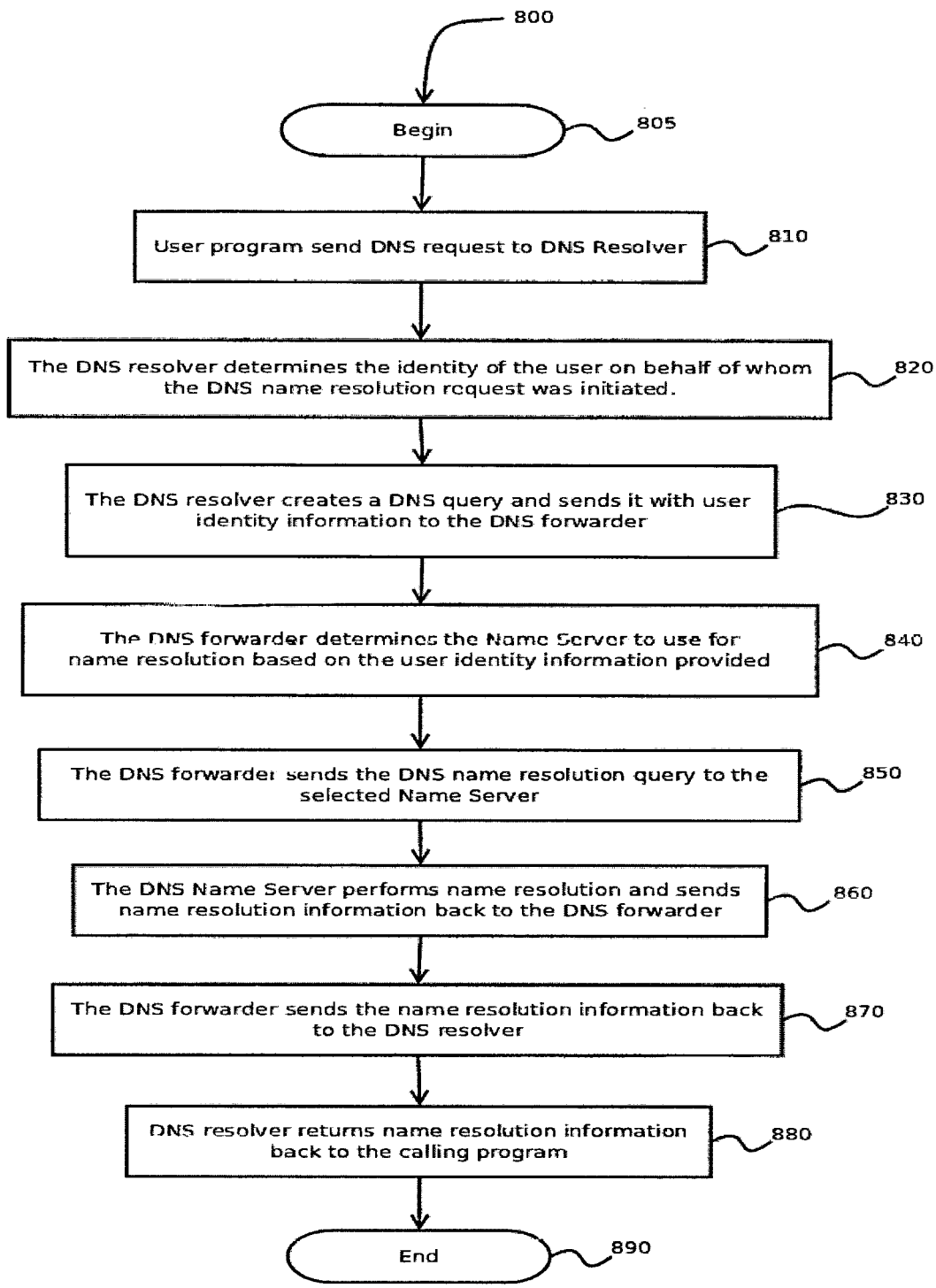
FIG. 8 is a flowchart illustrating a method of user identity differentiated DNS resolution, according to an embodiment shown in FIG. 4.

FIG. 8 is a flowchart of method 800 for providing user identity differentiated DNS name resolution, according to another embodiment of the present invention. The DNS name resolution process begins in step 805.

In step 810, the DNS Resolver receives a request for IP address(es) for one or more domain names.

In steps 820 and 830, the DNS Resolver determines the identity of the user on behalf of whom the DNS name resolution request was sent, creates a DNS query, and sends the user identity along with the DNS query to the DNS Forwarder.

In step 840, the DNS Forwarder determines the Name Server to use to fulfill the DNS name resolution request, by looking up user identity to Name Server mappings stored in the system. The DNS name resolution query is forwarded to the selected Name Server in step 850.

In steps 860, 870 and 880, the DNS name resolution request is fulfilled by the Name Server and results are sent back to the calling program by reversing the routes traversed by the request. The processing ends in step 890.

Figure 9:
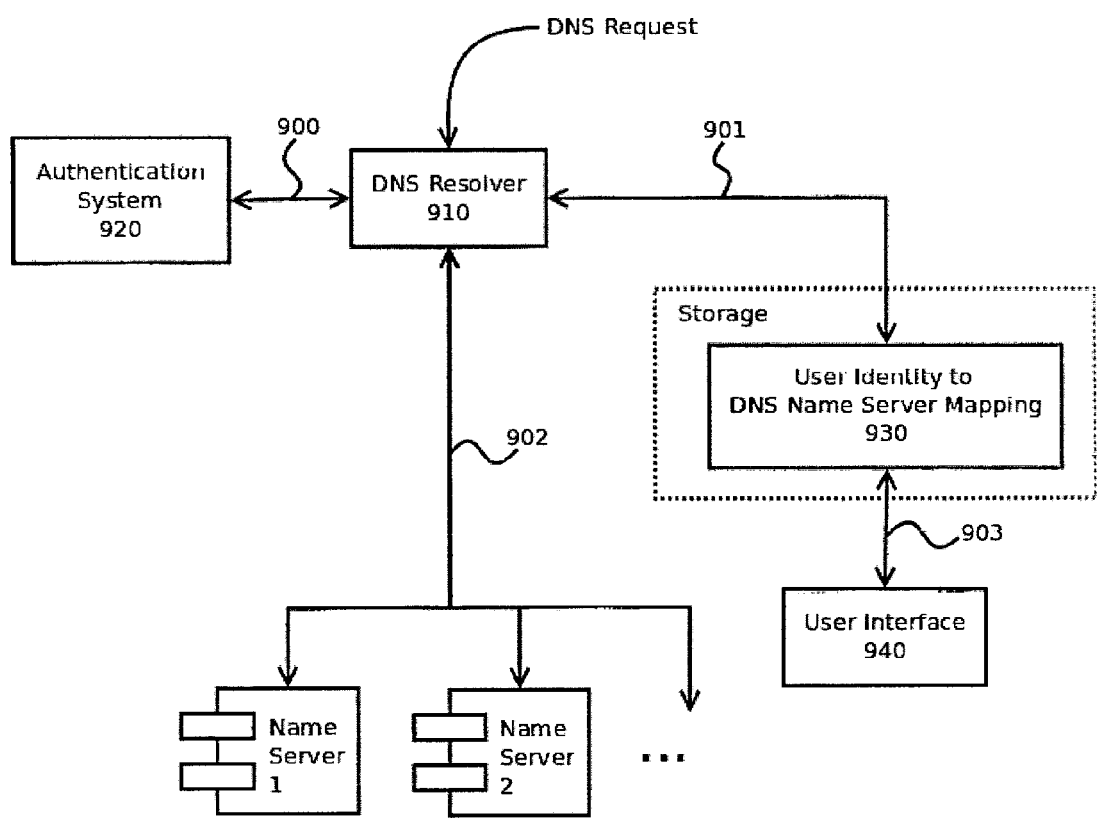
FIG. 9 is a diagram illustrating a logical architecture of a system that may be used to execute software of this invention, according to an embodiment.

FIG. 9 is a abbreviated block diagram for user identity differentiated DNS name resolution, according to an embodiment of the present invention. The system depicted in FIG. 9 includes DNS Resolver 910, Authentication System 920 User Identity to DNS Name Server Mapping 930, and User Interface 940. The DNS name resolution requests are received by the DNS Resolver 910. The DNS Resolver 910 obtains user identities from the Authentication System 920, determines the appropriate DNS Name Server to use by looking up User Identity to DNS Name Server Mapping 930, creates a DNS request query and sends it to the selected DNS Name Server (as depicted by line 902). A User Interface 940 may be provided to manage the User Identity to DNS Name Server Mapping 930.

Figure 10:
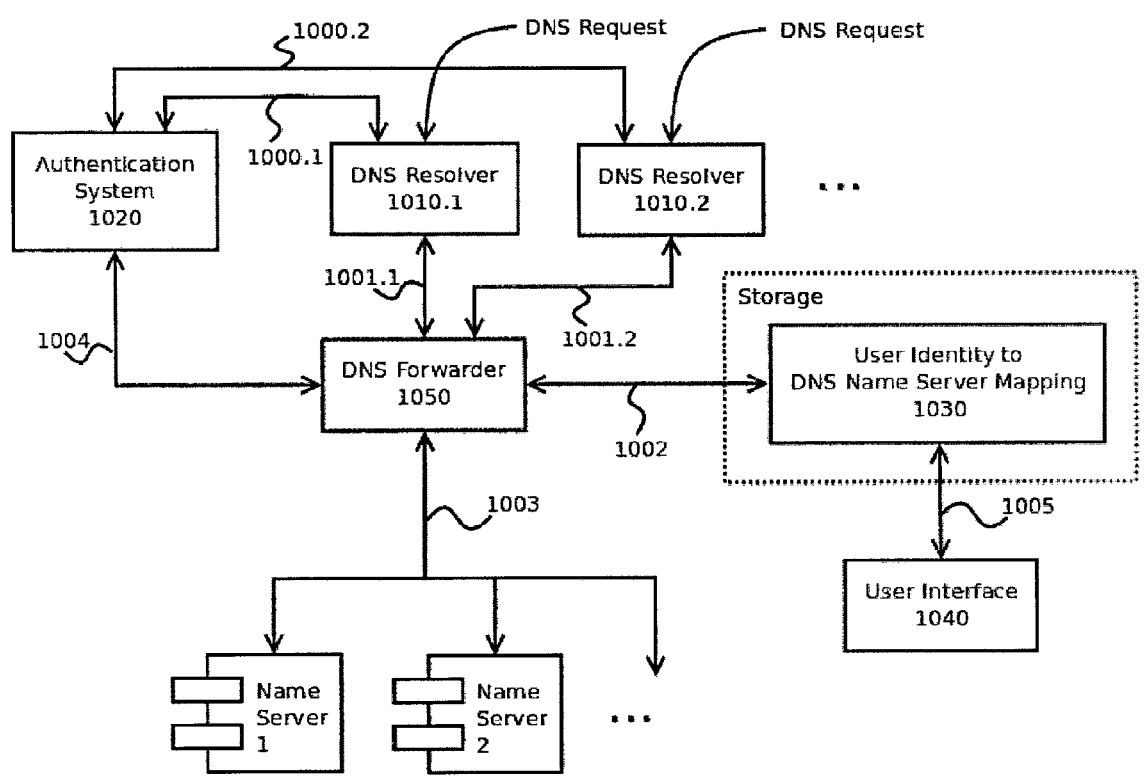
FIG. 10 is a diagram illustrating a logical architecture of a system that may be used to execute software of this invention, according to another embodiment.

FIG. 10 is a abbreviated block diagram for user identity differentiated DNS name resolution, according to another embodiment of the present invention. In addition to the components shown in FIG. 9, a DNS Forwarder 1050 may be added. As depicted in FIG. 10, multiple DNS Resolvers (1010.1, 1010.2, etc.) may utilize the same DNS Forwarder 1050 to perform user identity differentiated DNS name resolution. In some embodiments the DNS Forwarder 1050 may lookup the appropriate DNS Name Server to fulfill the DNS name resolution request based on the user identity associated with the request, as depicted by line 1002; in other embodiments the task may be performed by the DNS Resolvers, such as described in FIG. 9. User identities may be obtained by the DNS Resolvers (1010.1, 1010.2), or the DNS Forwarder (1050). In case the user identities are obtained by the DNS Resolvers, the DNS Forwarder 1050 may optionally reverify the user identity with the Authentication System 1020 (line 1004).

In some embodiments, the user identities may be provided by the operating system (OS), which authenticates users upon logging in. In other embodiments, the user identities may be provided by a centralized authentication system, such as an LDAP server or Microsoft Active Directory. In yet other embodiments, the user identities may be provided application programs, such as an authenticating proxy server. In yet other embodiments, the user identities may be substituted by identities of the devices the users are using. Some examples where device identities can substitute for user identities are: personal computers, smart phones, tablet computers, PDAs and game consoles. Usually such a device is used by a single user, or it is used for a single purpose. Such devices may be identified by their IP addresses or media access control (MAC) addresses.

In still further embodiments, users may be organized into groups, with group policies controlling the mapping between user groups and available DNS name servers.

In still further embodiments, the responses for DNS name resolution may be cached at various levels, for example, at a DNS Resolver, or at a DNS Forwarder if one is used. A DNS name resolution cache may store the responses on a per DNS Name Server basis, or per user basis.

Embodiments described herein are for illustrative purposes only. It should be understood that, with access to the teachings provided herein, various additional modifications, applications, and hardware and software configurations can be readily recognized by those skilled in the art. The breadth and scope of the present invention should not be limited by the descriptions and drawings presented herein, but instead should be determined with reference to the following claims along with their full scope and their equivalents.

What is claimed is:

1. A method for domain name system (DNS) resolution implemented in a computing device comprising:
   at a domain name system (DNS) resolver, receiving, from a client, a request to resolve a domain name or multiple domain names into their corresponding IP address or IP addresses, and receiving, from the said client, authentication credentials that identify the user;
   choosing, based on the user identity associated with the request, one or more recursive domain name servers from a plurality of recursive domain name system (DNS) servers available to the DNS resolver;
   sending the DNS request to the chosen recursive domain name system server or servers for the purpose of resolving the requested domain name or names for the said client;
   returning the response or responses from the chosen recursive domain name system server or servers back to the client.

2. the method of claim 1, wherein the user is authenticated by sending credentials directly to the domain name system (DNS) resolver.

3. the method of claim 1, wherein the user is authenticated by an application program.

4. the method of claim 1, wherein the user is authenticated by an operating system.

5. the method of claim 1, wherein the user is authenticated by a centralized authentication service.

6. the method of claim 1, wherein the user is authenticated by the identification of the client device.

7. the method of claim 1, wherein the user is authenticated by any other means of authentication service capable of identifying the user.

8. the method of claim 1, wherein responses from the chosen recursive domain name server or servers are stored in a local cache with specific allocations for each recursive domain name server or server group corresponding to specific user identity or user identities.

9. the method of claim 1, wherein the domain name system (DNS) resolver sends a response directly to the client based on data available in the local cache, or rules stored in storage media for the purpose of constructing an answer immediately by the DNS resolver, without consulting a recursive domain name server.

10. the method of claim 1, wherein the domain name system (DNS) resolver, based on user identity and rules configured for the DNS resolver, sends a DNS query for an alternate domain name in lieu of the original requested domain name to a recursive domain name server.

11. the method of claim 1, wherein the domain name system (DNS) resolver sends a domain name query to a DNS forwarder;
   at the DNS forwarder, receiving the domain name query from the said domain name system (DNS) resolver;
   at the DNS forwarder, sending the domain name query to the recursive domain name system (DNS) server chosen, based on user identity, by the domain name system (DNS) resolver to fulfill the domain name resolution request;
   passing back the response or responses from the recursive domain name system (DNS) server to the client via the said DNS forwarder and the said DNS resolver.

12. the method of claim 11, wherein the DNS forwarder, instead of the DNS resolver, choses, based on the user identity associated with the request, the recursive DNS server to fulfill the domain name request.

13. the method of claim 11, wherein the user identity is verified by the DNS resolver in cooperation with the DNS forwarder.

14. the method of claim 11, wherein a plurality of DNS resolvers utilize the same DNS forwarder to communicate with a single or a plurality of recursive DNS name servers.

15. the method of claim 11, wherein responses from the chosen recursive domain name server servers are stored in a local cache in the DNS forwarder, with specific allocations for each recursive domain name server or server group corresponding to specific user identity or user identities.

16. the method of claim 11, wherein the DNS forwarder sends a response directly to the DNS resolver based on data available in the local cache of the DNS forwarder, or rules stored in storage media for the purpose of constructing an answer immediately by the DNS forwarder, without consulting a recursive domain name server.

17. the method of claim 11, wherein the DNS forwarder, based on user identity and rules configured for the DNS forwarder, sends a DNS query for an alternate domain name in lieu of the original requested domain name to a recursive domain name server.

18. A system for domain name system (DNS) resolution comprising:
   a domain name system (DNS) resolver module to receive domain name system (DNS) resolution requests from a client;
   an authentication module that authenticates users of clients sending domain name system (DNS) resolution requests to the domain name system (DNS) resolver;
   a single or a plurality of recursive domain name system (DNS) servers that the domain name system (DNS) resolver is capable of communicating with; and
   a configuration module comprising a set of configuration files or a database or other storage that enables one or more processors to chose, based on user identity and rules, the recursive domain name system (DNS) server or servers to use for domain name system (DNS) resolution requests from an authenticated user.

19. The system of claim 18, further comprising a user interface module for managing the configuration module that determines the recursive domain name system (DNS) server to use for domain name system (DNS) resolution requests from an authenticated user.

20. The system of claim 18, further comprising a domain name system (DNS) forwarder through which domain name system (DNS) queries are sent by the domain name system (DNS) resolver to the recursive domain name system (DNS) server.

* * * * *